United States Patent
Chiew et al.

(10) Patent No.: US 12,038,952 B1
(45) Date of Patent: Jul. 16, 2024

(54) AERIAL IMAGE GEO-REGISTRATION VIA AERONAUTICAL DATABASE CONTENT AS GROUND CONTROL POINTS

(71) Applicant: Rockwell Collins, Inc., Cedar Rapids, IA (US)

(72) Inventors: Daniel Y. Chiew, Dalton Gardens, ID (US); Christopher A. Scherer, Cedar Rapids, IA (US); Ryan L. Niehaus, Cedar Rapids, IA (US); Roger L. Yum, Center Point, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 0 days.

(21) Appl. No.: 18/083,886

(22) Filed: Dec. 19, 2022

(51) Int. Cl.
*G06F 16/29* (2019.01)
*G06F 16/22* (2019.01)
*G06F 16/23* (2019.01)
*G06T 7/73* (2017.01)

(52) U.S. Cl.
CPC ............ *G06F 16/29* (2019.01); *G06F 16/22* (2019.01); *G06F 16/2365* (2019.01); *G06T 7/74* (2017.01); *G06T 2207/10032* (2013.01)

(58) Field of Classification Search
CPC ...... G06F 16/29; G06F 16/22; G06F 16/2365; G06T 7/74
See application file for complete search history.

(56) References Cited

U.S. PATENT DOCUMENTS

| | | | |
|---|---|---|---|
| 5,166,789 A | 11/1992 | Myrick | |
| 5,247,356 A | 9/1993 | Ciampa | |
| 5,414,462 A | 5/1995 | Veatch | |
| 10,627,232 B2 | 4/2020 | Pilkington et al. | |
| 10,984,552 B2 | 4/2021 | Lawlor et al. | |
| 11,010,950 B1 | 5/2021 | Jha et al. | |
| 11,113,528 B2 | 9/2021 | Pestov | |
| 11,468,593 B2 | 10/2022 | Heinonen | |
| 2002/0124171 A1* | 9/2002 | Rhoads | G06F 16/58 713/176 |
| 2007/0021908 A1* | 1/2007 | Jaugilas | G09B 29/005 701/450 |
| 2008/0063270 A1* | 3/2008 | McClelland | G06T 7/73 342/357.34 |
| 2010/0092045 A1* | 4/2010 | Zimmer | G06F 16/29 382/113 |
| 2011/0123066 A9 | 5/2011 | Chen et al. | |
| 2021/0209803 A1 | 7/2021 | Jha et al. | |

\* cited by examiner

*Primary Examiner* — Kannan Shanmugasundaram
(74) *Attorney, Agent, or Firm* — Suiter Swantz IP

(57) ABSTRACT

A system and method for creating avionic databases is disclosed. The system may receive an avionic database of an area, surveyed coordinate points of the area, and new satellite imagery of the area. The system may georeference the new satellite imagery using the surveyed coordinate points as ground control points, generating georeferenced coordinate points of the new satellite imagery in different locations of the area. The system may create a second avionic database based on the georeferenced coordinate points.

16 Claims, 4 Drawing Sheets

AERIAL IMAGE GEO-REGISTRATION VIA AERONAUTICAL DATABASE CONTENT AS GROUND CONTROL POINTS

TECHNICAL FIELD

The present disclosure relates to the technical field of georeferencing satellite imagery for updating avionic databases.

BACKGROUND

Various avionic display products utilize databases derived from satellite imagery, such as Airport Moving Map displays and Synthetic Vision displays.

Pre-existing aeronautical/avionic databases often contain coordinates of surveyed points, such as airport and runway databases and obstacles. However, these databases must be updated from time to time.

Georeferencing is often done via Ground Control Points (GCPs). For example, GCPs may be arbitrarily positioned throughout an area to provide points of precisely known location in a database. GCPs are typically determined by sending surveying teams to the location to use precise tools. Typically, the surveying team is sent out to measure GCPs each time a database needs to be updated (e.g., after a new runway was just added to an airport). Surveying GCPs is an expensive process.

Thus, there is a need to develop a more cost-effective method for updating avionic databases.

SUMMARY

A system and method for creating avionic databases is disclosed. In embodiments, the system receives an avionic database of an area, which includes surveyed coordinate points of the area, and new satellite imagery of the area. In embodiments, the system georeferences the new satellite imagery using the surveyed coordinate points as ground control points, generating georeferenced coordinate points of the new satellite imagery in different locations of the area. In embodiments, the system then creates a second avionic database based on the georeferenced coordinate points.

In some embodiments, the system aligns the surveyed coordinate points to the new satellite imagery, identifies new features in the new satellite imagery, and determines a georeferencing accuracy.

A method for creating avionic databases is disclosed. In embodiments, the method receives an avionic database of an area, which includes surveyed coordinate points of the area, and new satellite imagery of the area. In embodiments, the method georeferences the new satellite imagery using the surveyed coordinate points as ground control points, generating georeferenced coordinate points of the new satellite imagery in different locations of the area. In embodiments, the method creates a second avionic database based on the georeferenced coordinate points.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are example and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims.

DETAILED DESCRIPTION

Figure 1:
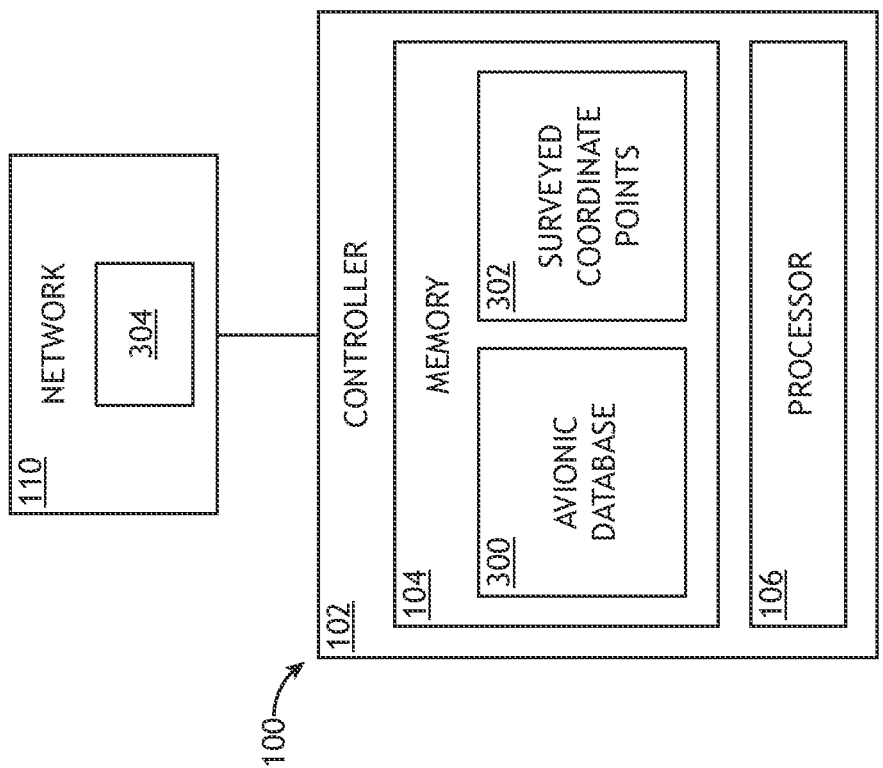
FIG. 1 is a block diagram of a system for updating avionic databases, in accordance with example embodiments of this disclosure.

Before explaining one or more embodiments of the disclosure in detail, it is to be understood that the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure that the embodiments disclosed herein may be practiced without some of these specific details. In other instances, well-known features may not be described in detail to avoid unnecessarily complicating the instant disclosure.

Broadly speaking, the present disclosure is directed to a system for creating a second avionic database based on imagery (e.g., satellite imagery). More specifically, the present invention relates to a system that uses a controller including one or more processors to create a second avionic database using georeferenced coordinate points. In particular, the system allows for the creating of databases without the need for a surveying team to be sent out. By aligning the features associated with surveyed points (e.g., existing GCPs) of an existing database with the same features in new satellite images, the distance between the existing GCPs may be georeferenced onto the new satellite images. The distance between these georeferenced GCPs and new features may be used to determine the location of georeferenced coordinate points corresponding to new features (e.g., new runway endpoints of constructed runway). While the georeferenced coordinate points generated with satellite imagery may not have the accuracy typical of surveyed GCPs, they may have sufficient enough precision and accuracy for various purposes, and can save costs by not requiring a survey crew to generate them on site. Typically, the existing surveyed points are sparse (e.g., only runway endpoints) while the georeferenced coordinate points generated with satellite imagery typically contain more detail (e.g., extracting taxi-ways, paint-markings, and building contours).

Figure 3:
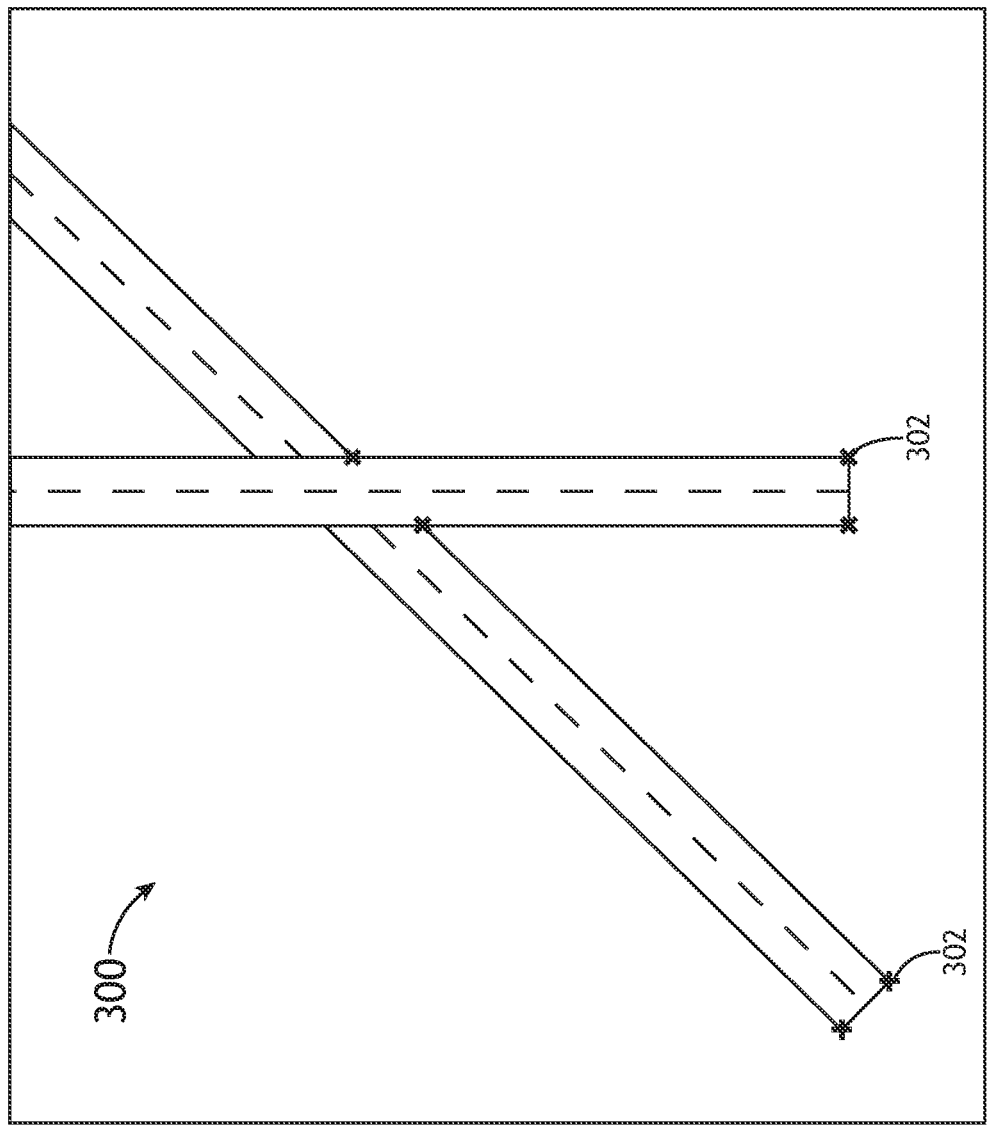
FIG. 3 is an illustration of an avionic database of an area with surveyed coordinate points superimposed on top, in accordance with example embodiments of this disclosure.

FIG. 1 is a block diagram of a system 100 for creating avionic databases (e.g., second avionic database 400 in FIG. 4), in accordance with example embodiments of this disclosure. The system 100 includes a controller 102 that is configured to execute a set of program instructions stored in a memory 104 and executed on a processor 106. The controller 102 may be communicatively coupled to a network 110 to receive new satellite imagery 304 of the area, but the network 110 isn't necessarily a part of the system 100. The network 110 and/or memory 104 may be used to store the avionic database 300 including surveyed coordinate points 302. An example of an avionic database 300 with surveyed coordinate points 302 is shown in FIG. 3.

Note that while the avionic database 300 and surveyed coordinate points 302 are shown separate, the avionic database 300 may include the surveyed coordinate points 302. Further, the avionic database 300 may include one or more avionic databases 300 with one or more sets of surveyed coordinate points 302. For purposes of the present disclosure, unless otherwise noted, surveyed coordinate points 302 are considered as included in, and often are included in, the avionic database 300, but are not necessarily required to be.

Figure 2:
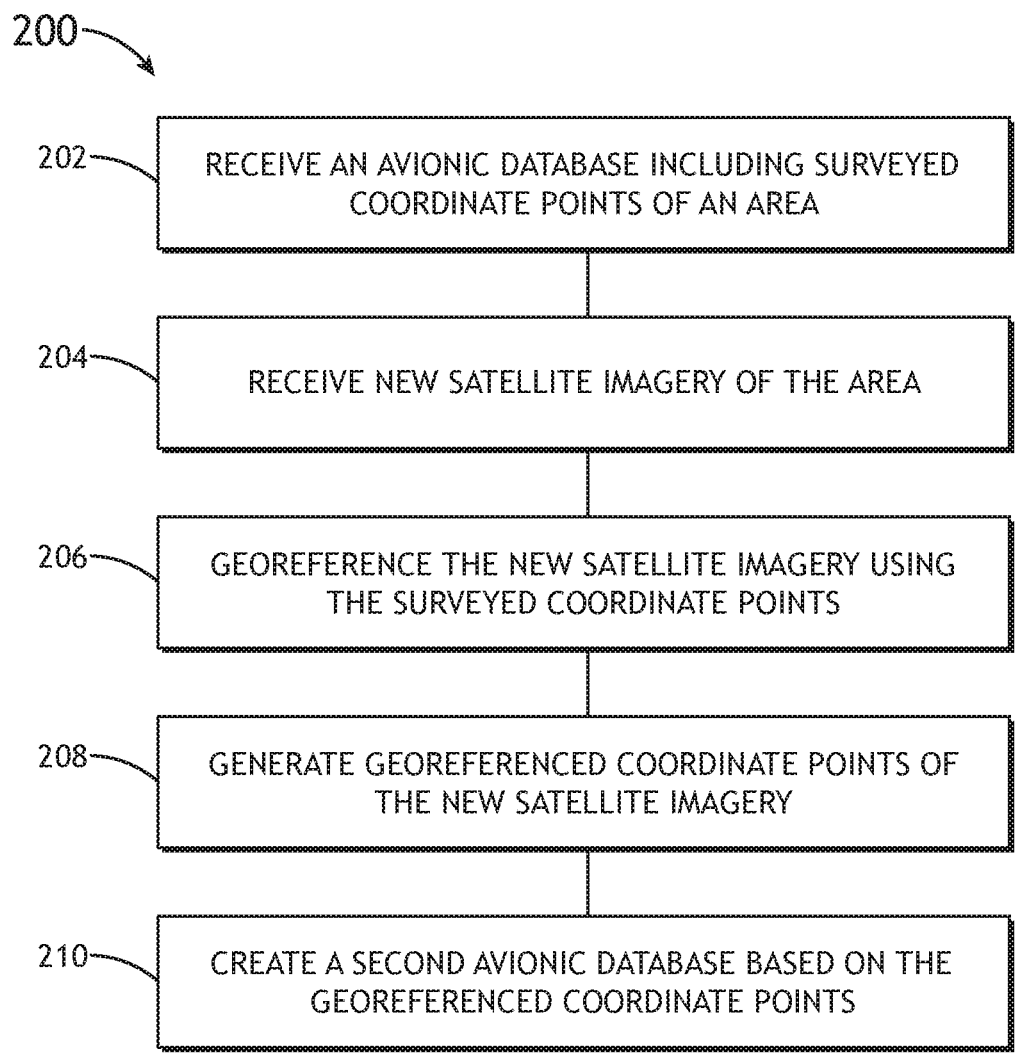
FIG. 2 is a flowchart illustrating a method for updating avionic databases, in accordance with example embodiments of this disclosure.

FIG. 2 is a flowchart 200 illustrating a method for creating avionic databases, in accordance with example embodiments of this disclosure. It is noted that such a method may generally be performed on the system 100, the controller 102, and/or any other controller.

At step 202 an avionic database 300 with surveyed coordinate points 302 of an area is received. For instance, the set of program instructions may be configured to cause the controller 102 to receive the avionic database 300 of the area including the surveyed coordinate points 302.

Generally, an avionic database 300 may graphically depict a variety of labeled and unlabeled features. For example, the avionic database 300 may depict unlabeled features such as runway thresholds, land and hold short lines, stopways, displaced areas, stand guidance lines, construction areas, airport reference point, windsocks, hot spots, water, and service roads. By way of another example, the avionic database 300 may label features such as, but not limited to, runways, apron areas, taxiways, buildings, parking stands, de-icing areas, and the like. The locations of these features may be used for airport and aircraft operations and labeled with points. In this regard, surveyed coordinate points 302 may include, but are not limited to, runway thresholds (e.g., runway endpoints), ILS antennas, surface movement points, stands, gates, obstructions in approach/takeoff path, and/or the like. For instance, AMDB data of the ARINC 816 standard may include surveyed coordinate points 302 such as key airport features (e.g., buildings and hard surfaces such as runways, taxiways, or aprons); operational functions (e.g., taxi lines, aircraft stands, de-icing areas, and holding positions); and virtually defined geometries (e.g., communication frequency areas). These surveyed coordinate points 302 may change locations over time and/or new surveyed coordinate points 302 may need to be added.

Another example of an avionic database 300 is ARINC 424, which meets DO-201 data capture requirements. The ARINC 424 aeronautical navigation database may be used for a variety of purposes, such as for flight management system (FMS) flight simulation, flight planning for pilot training, drone safety applications, and for many other aeronautical data products.

In embodiments, the avionic database 300 including surveyed coordinate points 302 are pre-existing. For example, the avionic database 300 may include the surveyed coordinate points 302 and be older data (e.g., data from before a runway was constructed). The surveyed coordinate points 302 may be, but are not limited to being, pre-existing avionic database GCPs. Such GCPs may be used generally for aircraft, drone, and satellite operations and are typically precise and expensive to generate.

At step 204, new satellite imagery 304 of the area is received.

At step 206, the new satellite imagery 304 is georeferenced using the surveyed coordinate points 302 as GCPs.

For example, the surveyed coordinate points 302 may be aligned to the new satellite imagery 304 to establish a coordinate system (e.g., GPS coordinates in latitude and longitude) that is compatible with the existing avionic database 300. This may be accomplished through a process of feature-level alignment, whereby the pre-existing features of the surveyed coordinate points 302 are mapped to the corresponding identified features of the new satellite imagery 304.

As a simplified example, this may essentially mean aligning features such as pre-existing runway endpoints in both the new satellite imagery 304 and the existing database. Once this alignment is achieved, new features in the new satellite imagery 304 may be mapped in accordance to the scaling and positions established by such an alignment. For example, relative pixel distances and previously known distances between the surveyed coordinate points 302 may be used to establish a distance per pixel on the new satellite imagery. In this regard, a georeferencing accuracy based on a pixel density of the new satellite imagery 304 may be determined. For example, a resolution (e.g., 100 cm per pixel, etc.) of the new satellite imagery 304 may be used to calculate a georeferencing accuracy of plus or minus half of such a resolution (e.g., plus or minus 50 cm). Such a resolution may be sufficient for many purposes. Being "used as GCPs" simply is that the accuracy and location of the surveyed coordinate points 302 may be used as anchor reference points when calculating other points on the new satellite imagery 304.

Accuracy of any new generated points may degrade as a function of the distance from the nearest the surveyed coordinate point 302. Therefore, care should be taken to ensure that, for the accuracy threshold required, there are enough surveyed coordinate point 302 near and/or in the area to be analyzed.

It is contemplated that accuracy of embodiments herein may result in, but is not necessarily limited to, an accuracy at or below a few feet (e.g., 1 foot or less, 2 feet or less, and the like) for features such as runway thresholds, surface movement points, and stands/gates. Further, accuracy may include, but is not limited to, being 10 feet or less for ILS antennas, and obstructions in approach/takeoff paths.

In an optional step, additional (or alternative) new feature data from a different source (e.g., secondary source) may be used for georeferencing and/or to generate georeferenced coordinate points 402. For example, new feature data (e.g., still images or video) from a camera on an aircraft may be used in addition or in lieu of the new satellite imagery 304. For instance, the new feature data may be images captured from an aircraft vantage point of the area during a landing or a takeoff. If used in addition to the new satellite imagery 304, the new feature data may be used to cross-check results, average results, and/or improve georeferencing accuracy of results of the georeferenced coordinate points 402.

In embodiments, a pixel distance between the surveyed coordinate points 302 and the georeferenced coordinate points 402 is calculated. This allows for calculating the actual location (e.g., GPS coordinates) of the georeferenced coordinate points 402 based on how far they are from the surveyed coordinate points 302 and a distance per pixel as described previously.

Figure 4:
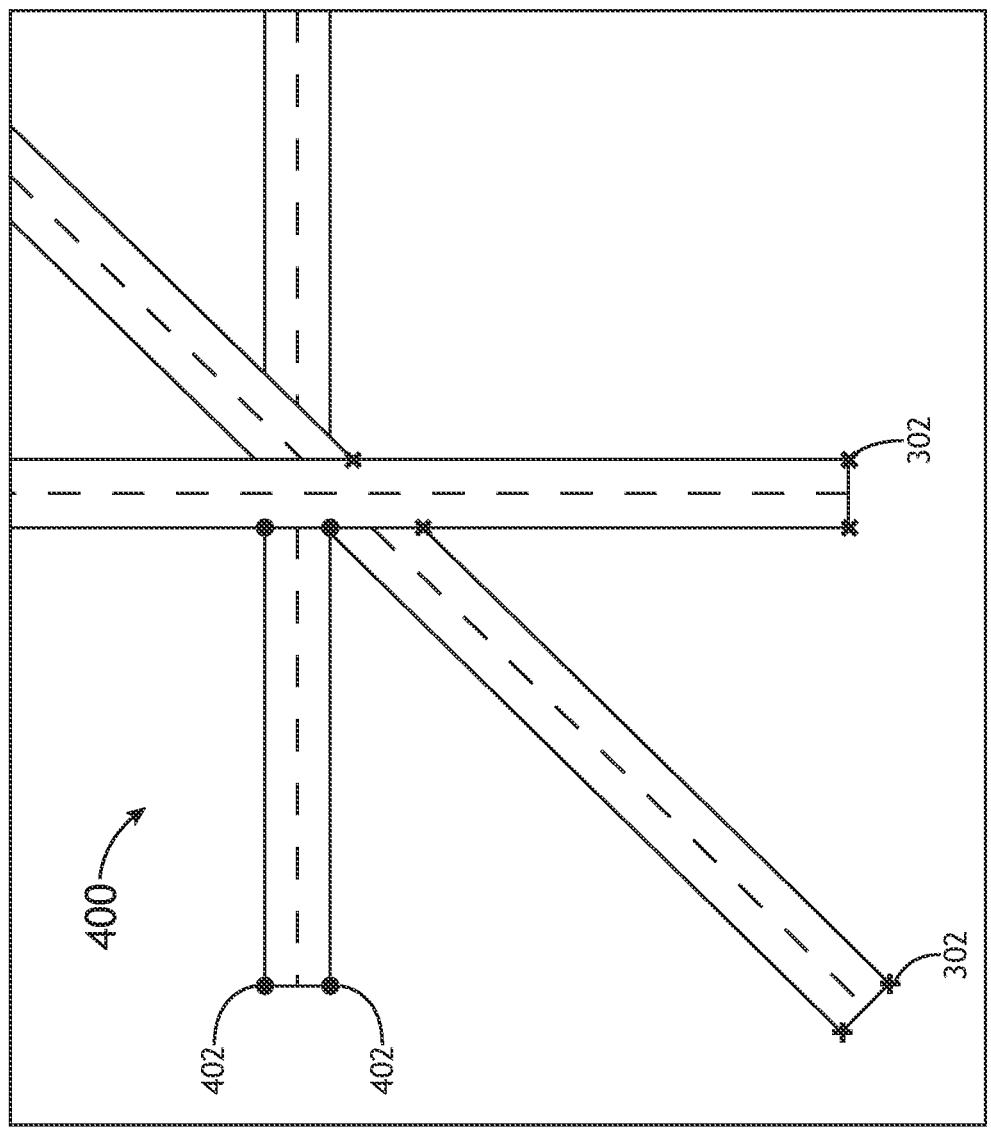
FIG. 4 is an illustration of an updated avionic database and newly added georeferenced coordinate points, in accordance with example embodiments of this disclosure.

At step 208, based on the georeferencing, georeferenced coordinate points 402 of the new satellite imagery 304 are generated in different locations of the area than positions of the surveyed coordinate points 302. For example, an second avionic database 400 is shown in FIG. 4 with georeferenced coordinate points 402 for a newly constructed runway.

At an optional step, new features (e.g., runway endpoints) are identified in the new satellite imagery to be georeferenced, where the new features are not in the avionic database 300. For example, a user (or an automated software) may determine which new features are important enough to be used for generating new points. In this regard, the generating of the georeferenced coordinate points 402 may be based on these new features in the new satellite imagery 304.

At step 208, the second avionic database 400 is created based on the georeferenced coordinate points 402. For example, the second avionic database 400 may include the georeferenced coordinate points 402 and the surveyed coordinate points 302. Note that, for purposes of this disclosure, "created" includes both "generated" and "updated. In this regard, the second avionic database 400 may be created from the ground up." In another regard, the second avionic database 400 may be updated by adding the georeferenced coordinate points 402 as additional points. In embodiments, at least one of: a terrain database, an obstacle database, or an airport moving map database may be created, which may be the second avionic database 400. The second avionic database 400 may be created with visuals of the new features, such as a graphic of a new runway, and the surveyed coordinate points 302 may also be added to the second avionic database 400.

FIG. 3 is an illustration of an avionic database 300 of an area with surveyed coordinate points 302 superimposed on top, in accordance with example embodiments of this disclosure. In this example, the surveyed coordinate points 302 are pre-existing avionic database Ground Control Points (GCPs) that are used as a reference for georeferencing new satellite imagery 304 (not shown in FIG. 3) of the area.

FIG. 4 is an illustration of a second avionic database 400 and georeferenced coordinate points 402, in accordance with example embodiments of this disclosure.

In embodiments, step 208 may include permanently creating a second avionic database 400 and/or dynamically (in real time) updating the second avionic database 400. For example, the new satellite imagery 304 may be recent (e.g., taken in the last 48 hours, in the last hour, or the like). For instance, the second avionic database 400 may be created using recent, new satellite imagery 304 that includes features (e.g., obstacles) on the runway. The second avionic database 400 may be sent to an aircraft mid-flight, for example, with such obstacles so the aircraft may adjust a landing approach. In this regard, the second avionic database 400 used by an aircraft may be dynamically updated, in real time, to account for newly identified features in satellite imagery. This may increase safety, reduce response time, and be performed at a relatively low-cost relative to manually sending out survey crews to map any avionic databases in real time.

In an optional step, the controller 102 may be configured to determine a change in flight plan (e.g., change in landing flight plan such as change in runway, change in takeoff plan based on obstacle) of an aircraft based on the second avionic database 400. By way of another example, the method may include sending the second avionic database 400 to an aircraft to improve situational awareness of pilots and/or improve automated flight software configured to fly an aircraft. The automated flight software may be any such automated software known in the art.

The system and method described herein provide a cost-effective and efficient way to create avionic databases. By using georeferenced coordinate points, the system can create avionic databases without the need for expensive surveying teams to be sent out to the area. This allows for more frequent and accurate updates to databases, improving safety and navigation for pilots and other users.

It is to be understood that embodiments of the methods disclosed herein may include one or more of the steps described herein. Further, such steps may be carried out in any desired order and two or more of the steps may be carried out simultaneously with one another. Two or more of the steps disclosed herein may be combined in a single step, and in some embodiments, one or more of the steps may be carried out as two or more sub-steps. Further, other steps or sub-steps may be carried in addition to, or as substitutes to one or more of the steps disclosed herein.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one" or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination or sub-combination of two or more such features, along with any other features which may not necessarily be expressly described or inherently present in the instant disclosure.

Although inventive concepts have been described with reference to the embodiments illustrated in the attached drawing figures, equivalents may be employed and substitutions made herein without departing from the scope of the claims. Components illustrated and described herein are merely examples of a system/device and components that may be used to implement embodiments of the inventive concepts and may be replaced with other devices and components without departing from the scope of the claims. Furthermore, any dimensions, degrees, and/or numerical ranges provided herein are to be understood as non-limiting examples unless otherwise specified in the claims.

What is claimed:

1. A system for creating avionic databases, the system comprising:

a controller including one or more processors configured to execute a set of program instructions stored in a memory, the set of program instructions configured to cause the one or more processors to:
receive an avionic database of an area including surveyed coordinate points of the area;
receive new satellite imagery of the area;
georeference the new satellite imagery using the surveyed coordinate points;
generate, based on the georeferencing, georeferenced coordinate points of the new satellite imagery in different locations of the area than positions of the surveyed coordinate points;
create a second avionic database based on the georeferenced coordinate points; and
identify new features in the new satellite imagery to be georeferenced, wherein the new features are not in the avionic database;
wherein the generating of the georeferenced coordinate points is based on new feature data from a secondary source to enhance georeferencing accuracy, wherein the secondary source is images captured from an aircraft vantage point of the area during a landing or a takeoff.

2. The system of claim 1, wherein the set of program instructions are further configured to align the surveyed coordinate points to the new satellite imagery before the georeferencing.

3. The system of claim 1, wherein the surveyed coordinate points are utilized as Ground Control Points (GCPs).

4. The system of claim 1, wherein the generating of the georeferenced coordinate points is based on the new features in the new satellite imagery.

5. The system of claim 4, wherein the set of program instructions are further configured to identify features in the new satellite imagery based on data from the avionic database.

6. The system of claim 1, wherein the set of program instructions are further configured to determine a georeferencing accuracy based on a pixel density of the new satellite imagery.

7. The system of claim 1, wherein the set of program instructions are further configured to calculate a pixel distance between the surveyed coordinate points and the georeferenced coordinate points.

8. The system of claim 1, wherein the set of program instructions are further configured to create, using the georeferenced coordinate points, at least one of: a terrain database, an obstacle database, or an airport moving map database.

9. A method for creating avionic databases, the method comprising:
receiving an avionic database of an area including surveyed coordinate points of the area;
receiving new satellite imagery of the area;
georeferencing the new satellite imagery using the surveyed coordinate points;
generating georeferenced coordinate points of the new satellite imagery in different locations of the area than positions of the surveyed coordinate points based on the georeferencing;
creating a second avionic database based on the georeferenced coordinate points; and
identify new features in the new satellite imagery to be georeferenced, wherein the new features are not in the avionic database;
wherein the generating of the georeferenced coordinate points is based on new feature data from a secondary source to enhance georeferencing accuracy, wherein the secondary source is images captured from an aircraft vantage point of the area during a landing or a takeoff.

10. The method of claim 9 further comprising aligning the surveyed coordinate points to the new satellite imagery before the georeferencing.

11. The method of claim 9, wherein the surveyed coordinate points are utilized as Ground Control Points (GCPs).

12. The method of claim 9, wherein the generating of the georeferenced coordinate points is based on the new features in the new satellite imagery.

13. The method of claim 12 further comprising identifying features in the new satellite imagery based on data from the avionic database.

14. The method of claim 9 further comprising determining a georeferencing accuracy based on a pixel density of the new satellite imagery.

15. The method of claim 9 further comprising calculating a pixel distance between the surveyed coordinate points and the georeferenced coordinate points.

16. The method of claim 9 further comprising creating, using the georeferenced coordinate points, at least one of: a terrain database, an obstacle database, or an airport moving map database.

* * * * *